K. A. SIMMON.
CONTROL SYSTEM.
APPLICATION FILED AUG. 9, 1915.
1,315,996.
Patented Sept. 16, 1919.
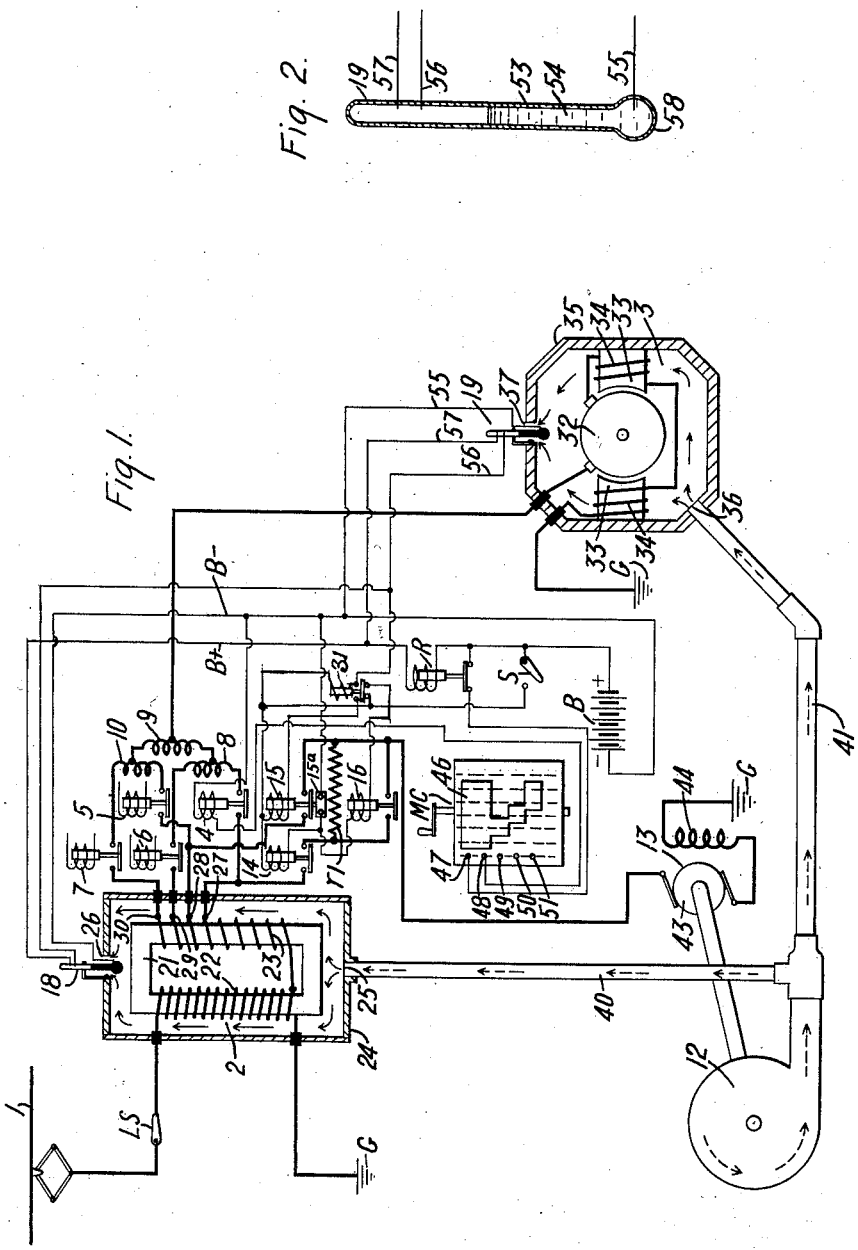
WITNESSES:
Fred A. Lind
D. H. Mace
INVENTOR
Karl A. Simmon
BY
Wesley G. Carr
ATTORNEY

UNITED STATES PATENT OFFICE.

KARL A. SIMMON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,315,996.     Specification of Letters Patent.     Patented Sept. 16, 1919.

Application filed August 9, 1915. Serial No. 44,408.

*To all whom it may concern:*

Be it known that I, KARL A. SIMMON, a citizen of the United States, and a resident of Edgewood Park, in the county of Allegheny and State of Pennsylvania, have invented a new and useful Improvement in Control Systems, of which the following is a specification.

My invention relates to control systems for electrical apparatus, and it has special reference to protective systems that are adapted to prevent the development of dangerously high temperatures in apparatus of the ventilated type.

One of the objects of my invention is to improve and simplify systems of the above-indicated class and to provide adequate means which shall be associated with the electrical device to be protected and which shall function in such manner as to temporarily increase the effectiveness of the ventilating system when the temperature reaches a predetermined value and to entirely remove or disconnect the load therefrom whenever the actual temperature of the device rises to a dangerously abnormal value.

More specifically, it is an object of my invention to provide a dynamo-electric machine, or other form of electrical apparatus of the inclosed type, with a system of ventilation for cooling the same and for associating therewith a thermostatic device which is influenced by the temperature of the outflowing cooling medium, and which acts, in conjunction with certain of the control switches and an electro-responsive relay, for increasing the voltage upon the blower or fan motor under predetermined temperature conditions and for interrupting the supply of energy to the device or disconnecting the load therefrom whenever the temperature thereof becomes excessive.

When electrical apparatus is employed under severe service conditions where it is subjected to heavy loads for comparatively long periods of time, there is danger to the apparatus by reason of the development of temperatures which are sufficiently high to cause deterioration and damage to the insulating material.

It is to obviate this difficulty that my invention is intended, and, in accordance therewith, whenever the temperature of the apparatus reaches approximately 85° C., for instance, a control circuit is completed that increases the voltage of the motor which drives the fan or blower of the ventilating system and thereby causes the forced ventilation to become more effective. If the temperature becomes so great as to be destructive to the apparatus, for instance, 100° C., my thermostatic means is brought into action to disconnect the load from the apparatus and thus relieve the apparatus from further abuse which might seriously damage or destroy it.

My invention may best be understood by reference to the accompanying drawing, Figure 1 of which is a diagrammatic view of a system control embodying my invention, and Fig. 2 is an enlarged view of a certain form of contact-making thermometer or thermostatic device which may conveniently be employed in my system of control.

Referring to the drawing, the system shown comprises a supply-circuit conductor 1, a transformer 2, a dynamo-electric machine 3, a plurality of unit switches 4, 5, 6 and 7 for governing the operation of said machine and arranging the circuit connections thereof to the transformer 2, a master controller MC for governing the energizing circuits of said unit switches, a plurality of reactance devices 8, 9 and 10 employed in conjunction with the unit switches, referred to, for preventing a local short-circuit upon the transformer 2, an electro-responsive relay R for interrupting the energizing circuit from a storage battery B to the master controller MC, a fan or blower 12 driven by a motor 13 for forcing a circulation of ventilating fluid through the transformer 2 and the dynamo-electric machine 3, a plurality of unit switches 14, 15 and 16 for governing the supply of energy to the driving motor 13, and a plurality of contact-making thermostatic devices 18 and 19 that are respectively associated with the transformer 2 and the machine 3 and which serve to increase the voltage of the driving motor 13 under predetermined temperature conditions and to subsequently, through coöperation with the relay R, interrupt the supply of energy to the master controller and thereby effect the opening of the unit switches 4, 5, 6 and 7.

The supply-circuit conductor 1 may constitute a trolley conductor of an electric railway system, and, in the system illustrated, is adapted to deliver alternating current to the transformer 2 through a line switch LS which, for simplicity, is shown as manually operated.

The transformer 2 comprises a magnetizable core 21, a primary winding 22 and a secondary winding 23, which parts are inclosed by a casing 24 through which the ventilating medium is forced. The structural details of the transformer are, of course, unessential to my invention and may be varied greatly so long as the transformer is of the inclosed type and is adapted to be cooled by a suitable ventilating system. The inclosing casing 24 is provided with an inlet opening 25 and an outlet opening 26 through which the ventilating medium is respectively introduced and discharged, and the thermostatic device 18 is positioned in proximity to the outlet opening 26 and in the path of the cooling fluid.

The primary winding 22 of the transformer 2 is connected between the supply-circuit conductor 1 and the ground G, and the secondary winding 23 is provided with a plurality of taps 27, 28, 29 and 30, connections to which are made by means of the respective unit switches 4, 5, 6 and 7 in accordance with the usual practice. The transformer secondary winding 23 is also connected to the ground G. The unit switches referred to, and the unit switches 14, 15 and 16, as well, may be of any suitable construction and may, in fact, be operated either electromagnetically or electro-pneumatically, although I have illustrated switches of the electromagnetic type. As the use of current-limiting reactances, such as are indicated at 8, 9 and 10, is old and familiar in the art, no description of these devices is deemed necessary.

The dynamo-electric machine 3 may be of any well-known construction, since its particular structural details form no part of my present invention and, as shown, said machine embodies an armature 32, a plurality of field-magnet projections 33, field-magnet windings 34 and a magnetizable inclosing frame 35 which constitutes a part of the field-magnet structure and completely incloses the machine. The machine frame 35 is provided with an inlet opening 36, through which the ventilating medium is introduced, and an outlet opening 37 for permitting the discharge thereof. The thermostatic device 19 is disposed within or near the outlet opening 37 so that it is influenced by the temperature of the outgoing heated medium. One terminal of the machine 3 is connected to the ground G and the other is adapted for connection to one of the taps of the transformer secondary winding 23 through one of the unit switches 4, 5, 6 and 7.

The fan or blower 12 and its driving motor 13 pertain to my invention only as they constitute essential elements of an operative combination, and the structural features thereof are, therefore, of minor importance. Any form of blower or driving motor may be employed. The blower 12 is connected by suitable conduits 40 and 41 to the transformer casing 24 and motor frame 35, respectively, for conducting the forced ventilating medium to the transformer 2 and the machine 3.

The driving motor 13 may conveniently be of the single-phase commutator type and comprises an armature 43 and a field-magnet winding 44 which are connected in series-circuit relation between the ground G and the taps 27 and 28 of the transformer secondary winding 23, to which connections are established through the unit switches 14, 15 and 16, as will be hereinafter set forth.

The master controller MC may be of any form commonly employed and is adapted to occupy a plurality of positions for the purpose of energizing the several unit switches 4, 5, 6 and 7 in a predetermined sequence, such sequence being determined by the configuration of a movable conducting segment 46 which is adapted for coöperative engagement with a plurality of stationary contact terminals 47, 48, 49, 50 and 51. For purposes of simplicity, I have shown only the control-circuit connections between the master controller MC and the unit switch 4, it being believed to be unessential to illustrate all of the energizing circuits of the unit switches, on account of their simplicity and common use in the art.

The thermostatic devices 18 and 19 are of like construction, although the exact form and mode of operation thereof are relatively unimportant, inasmuch as any suitable contact-making device which is dependent for its operation upon temperature conditions, may be employed. These devices may be of the contact-making thermometer type, as illustrated, or may conveniently take the form of the ordinary bi-metal thermostat. As shown, the thermostatic devices are of the thermometer type and comprise a glass tube 53 which contains a body of mercury 54 and is provided with a plurality of conducting wires 55, 56 and 57 which are inserted through the bulb 58 and through upper portions of the tube 53. The conducting wires referred to are firmly embedded or sealed in position and project within the device in such manner as to make contact with the body of mercury 54 under certain conditions. For purposes of explanation, it will be assumed that the conducting wires 56 and 57 are positioned at heights which correspond respectively to temperatures of 85° C. and 100° C.

Assuming the circuit connections to be as shown in the drawing, the operation of the system is as follows: Switch S is first closed to complete a circuit from the positive side of the battery B, which includes the switch S, and thence, in parallel, through the energizing coil of unit switch 14 and unit switch 16 to an interlock switch 15a that is closed when the unit switch 15 is open, and thence to the negative side of the battery.

Unit switches 14 and 16, therefore, are energized and closed to complete a circuit from tap 27 of the transformer winding 23 which includes the contact members of unit switch 14, contact members of unit switch 16, armature 43 and field-magnet winding 44 of the driving motor 13 to the ground G. The blower motor 13, therefore, is started into operation to run the blower 12 and force the ventilating fluid through the transformer 2 and the machine 3.

In order to start up the motor 3, the master controller MC is moved to its first position, thereby completing a circuit from the positive side of the battery B which includes contact members of the electro-responsive relay R, contact members 47 and 48, which are bridged by the conducting segment 46 of the master controller MC, energizing coil of unit switch 4 and thence to the negative side of the battery. Unit switch 4 is thus energized and closed to connect the dynamo-electric machine 3 to tap 27 of the transformer winding 23 through the coöperating contact members of said unit switch and through portions of the reactances 8 and 9, as will be understood. The speed of the motor 3 may, of course, be increased by suitable manipulation of the master controller MC through its several positions, whereby the unit switches 5, 6 and 7 may be closed progressively.

If the system is in operation, as set forth, under heavy-load conditions, the temperature of the various pieces of apparatus, such as the transformer 2 and the motor 3, rises, and, so long as it does not exceed the predetermined abnormal value for which the thermostatic devices 18 and 19 are adapted to act, the operation of the system, as a whole, is, of course, unaffected.

However, in the event of heavy continuous service or of over-load conditions which result in heating the apparatus above a predetermined value which has been assumed to be 85° C., then the thermostatic device associated with the particular apparatus so affected is brought into action in a manner to be set forth. For instance, if the temperature of the motor 3 rises to this predetermined value, the mercury 54 in the contact-making thermometer 19 rises into contact with the conducting wire 56, whereby a circuit is established from the positive side of the battery B which includes switch S, energizing coil of unit switch 15, contact wires 56 and 55, and the body of mercury 54 of the thermostatic device 19 and thence to the negative side of the battery B. Unit switch 15, therefore, is energized and closed to connect the blower-motor 13 to the transformer tap 28. In so doing, its interlock switch 15a is opened to interrupt the energizing circuits of the unit switches 14 and 16. These unit switches, therefore, are deenergized and opened, while the resistor $r^1$ and the relay device 31, or any other familiar interlocking scheme, serves to prevent a local short-circuit during this transition of connections. Thus, the voltage of the driving motor 13 is increased and, therefore, its speed is accordingly increased, whereby a greater circulation of ventilating fluid through the transformer 2 and the motor 3 is effected, which may be sufficient to dissipate the heat generated therein and prevent the temperature from becoming dangerously high.

If, however, the load upon the system is so great that this increase in the effectiveness of the ventilating system is insufficient to hold the temperature within safe limits, and the temperature of the outflowing medium through the machine 3 reaches a dangerous and ultimate value of 100° C., then the body of mercury completes an electrical connection with the conducting wire 57, whereby the operating coil of the electro-responsive relay R is connected directly across the battery B. The relay R then becomes energized to effect the separation of its coöperating contact members and thus interrupt the supply of energy to the master controller MC and, consequently, through it to the control unit switches 4, 5, 6 and 7. In this manner, these unit switches are deënergized and opened to disconnect the motor 3 from the transformer 2, whereby the load upon the system is entirely cut off, although the motor-driven blower 12 is still maintained in operation to dissipate the heat of the ventilated transformer 2 and motor 3. Thus, the apparatus is protected against dangerously high temperature conditions which might result in the ultimate destruction or impairment of the insulating material of the apparatus.

It will, of course, be understood that my invention is not restricted, in any way, to the particular forms of apparatus herein shown and described but is applicable to electrical apparatus of any character whatsoever and would be especially useful in motors, transformers, starting resistors or liquid rheostats of railway car equipments or electric locomotives, although stationary apparatus of this general character may be equally well protected in the manner set forth. Therefore, inasmuch as my invention has a broad field of application and may be embodied in apparatus of different classes from that herein set forth, I desire that only such limitations shall be imposed as are indicated in the appended claims.

I claim as my invention:

1. The combination with an inclosed dynamo-electric machine, a source of energy therefor, and a plurality of electrically-operated switches for governing the circuit connections of said machine, of electro-responsive means for deënergizing said switches whenever the temperature of the outgoing ventilating air from said machine exceeds a predetermined amount.

2. The combination with an inclosed electrical device, a system of ventilation for delivering a cooling medium therethrough, and a plurality of electrically-operated switches for governing the circuit connections of said device, of an electromagnetic relay for controlling the energization of said switches, and a thermostatic device associated with said electrical device and disposed in the path of the outgoing cooling medium for causing said relay to be energized to interrupt the energization of said switches when the temperature of the outgoing medium exceeds a predetermined amount.

3. The combination with an inclosed electrical device, a system of ventilation for delivering cooling air thereto, a plurality of electrically-operated switches for governing the connections of said device, and a master controller for controlling the energization of said switches, of an electro-responsive relay in circuit with the master controller and adapted to govern the energization thereof, and thermostatic means associated with said inclosed electrical device and in the path of outgoing ventilating air therefrom for causing said electro-responsive relay to interrupt the energization of said master controller when the temperature of the outgoing cooling medium reaches a predetermined value.

4. The combination with an electrical device, and an inclosed casing therefor having an inlet and an outlet opening for the passage of ventilating medium, of a thermostatic device associated with said inclosing casing and disposed in proximity to the outlet opening thereof and in the path of the ventilating medium.

5. In a dynamo-electric machine, the combination with an inclosing casing having an inlet and an outlet opening for the passage of ventilating air, and a system of ventilation for delivering air to said machine, of a thermostatic device disposed in the outlet opening and influenced by the temperature of the outgoing medium.

6. The combination with an electrical device, a system of ventilation therefor, and a load, of means for increasing the effectiveness of the ventilating system and for disconnecting the load under predetermined temperature conditions of the electrical device.

7. The combination with an electrical device, a load therefor, and a system of ventilation for cooling said device, of means for increasing the effectiveness of the ventilating system under predetermined temperature conditions of said device and for subsequently disconnecting the load under other predetermined temperature conditions thereof.

8. The combination with an electrical device, a system of ventilation therefor, and a plurality of electrically operated switches for adjusting the circuit connections of said device, of means associated with said device and dependent upon the temperature thereof for increasing the effectiveness of the ventilating system and for interrupting the energization of said switches under different predetermined temperature conditions.

9. The combination with an electrical device, a motor-driven blower for cooling said device and a load therefor, of means associated with said device and dependent upon the temperature thereof for increasing the speed of said motor-driven blower under predetermined temperature conditions and for disconnecting said load and leaving the motor-driven blower in operation under other predetermined temperature conditions.

10. The combination with an electrical device, a system of ventilation therefor, and electrical means for varying the connections of said device, of means governed by the temperature of the ventilating fluid passing through the electrical device for regulating said ventilating system and for governing said electrical means.

In testimony whereof, I have hereunto subscribed my name this 31st day of July, 1915.

KARL A. SIMMON.